(12) United States Patent
Nakate et al.

(10) Patent No.: US 8,998,342 B2
(45) Date of Patent: Apr. 7, 2015

(54) CONVEYANCE VEHICLE (71) Applicant: Hitachi Construction Machinery, Co., Ltd., Tokyo (JP)

(72) Inventors: Youhei Nakate, Tsuchiura (JP); Takanobu Ikari, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/232,382

(22) PCT Filed: Oct. 12, 2012

(86) PCT No.: PCT/JP2012/076472
§ 371 (c)(1),
(2) Date: Jan. 13, 2014

(87) PCT Pub. No.: WO2013/073325
PCT Pub. Date: May 23, 2013

(65) Prior Publication Data
US 2014/0152073 A1 Jun. 5, 2014

(30) Foreign Application Priority Data
Nov. 14, 2011 (JP) ................. 2011-248424

(51) Int. Cl.
*B60P 1/16* (2006.01)
(52) U.S. Cl.
CPC ..................... *B60P 1/162* (2013.01)

(58) Field of Classification Search
USPC ............. 298/7, 22 C, 22 R, 22 P; 254/93 VA; 180/271, 272
See application file for complete search history.

(56) References Cited

U.S. PATENT DOCUMENTS 7,604,300 B2 * 10/2009 Whitfield et al. ........... 298/22 C
8,033,614 B2 10/2011 Nabeshima et al.
8,328,291 B2 12/2012 Nakate et al.

FOREIGN PATENT DOCUMENTS

| JP | 2001-105954 A | 4/2001 |
| WO | 2008/099691 A1 | 8/2008 |
| WO | 2010/092873 A1 | 8/2010 |

* cited by examiner

*Primary Examiner* — Stephen Gordon
(74) *Attorney, Agent, or Firm* — Mattingly & Malur, PC (57) ABSTRACT

A hoist cylinder for rotationally moving a vessel provided between a vehicle body and the vessel, and first and second directional control valves for controlling supply and discharge of a pressurized oil with respect to the hoist cylinder are provided. The first and second directional control valves have a neutral position, a raising position where the vessel is rotationally moved upward, a lowering position where the vessel is rotationally moved downward, and a floating position where free fall of the vessel is allowed by contracting the hoist cylinder by the weight of the vessel. A flow control valve is provided between the first directional control valve and a tank, which controls a flow rate of the pressurized oil discharged from the hoist cylinder into the tank when the first directional control valve is set at the floating position and the vessel freely falls due to its own weight.

5 Claims, 5 Drawing Sheets

CONVEYANCE VEHICLE

TECHNICAL FIELD

The present invention relates to a conveyance vehicle such as a dump truck and the like suitably used for transportation of mined crushed stones, excavated earth and sand and the like mined at an open-air stope, quarry, mine and the like.

BACKGROUND ART

A large-sized conveyance vehicle called a dump truck is provided with a loading platform provided on a vehicle body capable of moving up/down. This dump truck loads an objects to be transported (a load) such as crushed stones, earth and sand and the like on the loading platform and transports and conveys it to an unloading site and a load collecting site such as an export port or the like, for example.

The conveyance vehicle is composed of an automotive vehicle body, a loading platform provided on a vehicle body for loading an objects to be transported such that the front side is rotatable in an upward and downward direction by using the rear side as a fulcrum, a hoist cylinder provided capable of extension/contraction between the loading platform and the vehicle body and rotationally moving the loading platform upward by extending, a hydraulic power source for supplying a pressurized oil for operation to the hoist cylinder, and a control valve device provided between the hydraulic power source and the hoist cylinder and controlling supply and discharge of the pressurized oil with respect to the hoist cylinder.

The control valve device used in the conveyance vehicle has four switching positions in total, which are a neutral position, a raising position, a lowering position, and a floating position. The control valve device stops supply or discharge of the pressurized oil with respect to the hoist cylinder at the neutral position so as to stop movement of the hoist cylinder, while at the raising position, the control valve device extends the hoist cylinder by supply or discharge of the pressurized oil so as to rotationally move the loading platform upward. Moreover, the control valve device contracts the hoist cylinder by supply or discharge of the pressurized oil at the lowering position so as to rotationally move the loading platform downward and contracts the hoist cylinder by discharging the pressurized oil by the weight of the loading platform at the floating position so as to allow free fall of the loading platform.

This control valve device is selectively switched to one of the four switching positions in total by operation of a operating lever by an operator. Therefore, the conveyance vehicle runs to the load collecting site in a state in which an objects to be transported such as earth and sand is loaded on the loading platform and then, extends a rod of the hoist cylinder so as to rotationally move the front side of the loading platform upward and discharges the loaded objects to be transported to the load collecting site along inclination of this loading platform (Patent Document 1).

PRIOR ART DOCUMENT

Patent Document

Patent Document 1: International Publication No. WO2008/099691 A

SUMMARY OF THE INVENTION

In the conveyance vehicle according to a conventional art, when the control valve device is switched to the floating position, the pressurized oil is discharged from the hoist cylinder by the weight of the loading platform, and the hoist cylinder is contracted. Therefore, the loading platform enters a free fall state in which the front side rotationally moves downward by its own weight and then, is seated on the vehicle body.

In the control valve device, a throttle for limiting a flow rate of the pressurized oil discharged from the hoist cylinder when this control valve device is set at the floating position is provided. As a result, an impact occurring when the loading platform freely falling by its own weight is seated on (brought into contact with) the vehicle body can be alleviated.

The weight of the loading platform is determined by a weight obtained by adding the weight of the objects to be transported and loaded on the loading platform and the weight of the loading platform single unit. Therefore, the weight of the loading platform is largely different between a case in which the objects to be transported is not loaded on the loading platform and a case in which the objects to be transported is loaded on the loading platform.

On the other hand, a throttle amount of the throttle for limiting a flow rate of the pressurized oil discharged from the hoist cylinder when the control valve device is set at the floating position is usually set such that an impact can be alleviated when the loading platform on which the objects to be transported is loaded, that is, the loading platform with a large weight is seated on the vehicle body.

Thus, if the loading platform with a small weight on which the objects to be transported is not loaded is allowed to freely fall with the control valve device set at the floating position, a moving speed of this loading platform with a small weight is limited more than necessary, and a problem is caused that it takes a long time until the loading platform is seated on the vehicle body.

In view of the foregoing problem in the conventional art, it is an object of the present invention to provide a conveyance vehicle which can adjust a speed of the loading platform which freely falls when the loading platform is allowed to freely fall by its own weight with the control valve device set at the floating position.

(1) A conveyance vehicle according to the present invention comprises an automotive vehicle body; a loading platform provided on the vehicle body for loading an objects to be transported such that a front side is rotationally movable in an upward and downward direction by using a rear side as a fulcrum; a hoist cylinder provided capable of extension/contraction between the loading platform and the vehicle body and rotationally moving the loading platform upward by extending; a hydraulic power source for supplying a pressurized oil for operation with respect to the hoist cylinder; and a control valve device provided between the hydraulic power source and the hoist cylinder and controlling supply and discharge of the pressurized oil with respect to the hoist cylinder, in which the control valve device has a plurality of switching positions including a neutral position where supply/discharge of the pressurized oil with respect to the hoist cylinder is stopped so as to stop movement of the hoist cylinder, a raising position where the hoist cylinder is extended by supply/discharge of the pressurized oil so as to rotationally move the loading platform upward, a lowering position where the hoist cylinder is contracted by supply/discharge of the pressurized oil so as to rotationally move the loading platform downward, and a floating position where the hoist cylinder is contracted by discharging the pressurized oil by the weight of the loading platform so as to allow free fall of the loading platform.

A feature of the configuration employed by the present invention is that a flow control valve for controlling a flow rate of the pressurized oil discharged from the hoist cylinder when the control valve device is at the floating position is provided between the control valve device and a tank.

With this arrangement, if the control valve device is switched to the floating position, the pressurized oil is discharged from the hoist cylinder by the weight of the loading platform, and the loading platform freely falls by means of contraction of the hoist cylinder. At this time, since the flow control valve controls the flow rate of the pressurized oil discharged from the hoist cylinder, a speed of free fall of the loading platform by its own weight can be appropriately adjusted for the case in which the objects to be transported is loaded on the loading platform and the case in which the objects to be transported is not loaded.

(2) According to the present invention, the flow control valve controls a flow rate of the pressurized oil in accordance with the pressure of the pressurized oil flowing out of the control valve device.

With this arrangement, if the pressure of the pressurized oil flowing out of the control valve device becomes larger since the loading platform with a large weight on which the objects to be transported is loaded freely falls, the speed when the loading platform freely falls can be lowered by decreasing the flow rate of the pressurized oil flowing out of the control valve device. As a result, an impact when the loading platform with a large weight is seated on (brought into contact with) the vehicle body can be alleviated.

On the other hand, if the pressure of the pressurized oil flowing out of the control valve device becomes lower since the loading platform with a small weight on which the objects to be transported is not loaded freely falls, the speed when the loading platform freely falls can be raised by increasing the flow rate of the pressurized oil flowing out of the control valve device. As a result, time until the loading platform with a small weight is seated on the vehicle body can be reduced, and workability when the objects to be transported loaded on the loading platform is discharged can be improved.

(3) According to the present invention, a throttle is provided at the floating position of the control valve device; and a throttle connected in series to the throttle when the pressurized oil flowing out through the floating position of the control valve position exceeds a predetermined pressure is provided on the flow control valve.

With this arrangement, if the falling speed of the loading platform which freely falls when the control valve device is set at the floating position is large and the pressurized oil flowing out of the floating position of the control valve device and acting on the flow control valve exceeds the predetermined pressure, the throttle of the control valve device and the throttle of the flow control valve are connected in series. Therefore, the flow rate of the pressurized oil discharged from the hoist cylinder can be reliably decreased by the two throttles, and the falling speed of the loading platform can be lowered so as to be seated on the vehicle body slowly.

(4) According to the present invention, the flow control valve has a communicating position where the pressurized oil from the hoist cylinder is discharged to the tank, a throttling position where a throttle for throttling the pressurized oil discharged toward the tank is provided, a valve spring for urging the flow control valve toward the communicating position all the time, and a hydraulic pilot portion for receiving the pressurized oil flowing out of the control valve device as a pilot pressure; and the flow control valve is switched from the communicating position to the throttling position in case the pressure of the pressurized oil flowing out of the control valve device exceeds an urging force of the valve spring.

With this arrangement, if the falling speed of the loading platform when the control valve device is set at the floating position is large, the pressure acting on the inlet side of the flow control valve by the pressurized oil flowing out of the control valve device exceeds the urging force of the valve spring of the flow control valve. As a result, the flow control valve is switched to the throttling position, and the falling speed of the loading platform can be lowered. On the other hand, if the falling speed of the loading platform when the control valve device is set at the floating position is small, the pressure acting on the inlet side of the flow control valve by the pressurized oil flowing out of the control valve device becomes the urging force or less of the valve spring of the flow control valve. As a result, the flow control valve holds the communicating position, and the loading platform can be smoothly allowed to fall.

(5) According to the present invention, a throttle is provided at the floating position of the control valve device; and when the control valve device is switched to the floating position and the flow control valve is switched to the throttling position, the throttle of the control valve device and the throttle of the flow rate control are connected in series.

With this arrangement, when the control valve device is set at the floating position, a falling speed of the loading platform is large, and when the flow control valve is switched to the throttling position, the throttle of the control valve device and the throttle of the flow control valve are connected in series. Therefore, the flow rate of the pressurized oil discharged from the hoist cylinder to the tank can be reliably decreased by the two throttles, and the falling speed of the loading platform can be decreased and the loading platform can be slowly seated on the vehicle body.

(6) According to the present invention, the control valve device is constituted by combining a first directional control valve switched to any one of the neutral position, the raising position, and the floating position and a second directional control valve switched to any one of the neutral position, the raising position, and the lowering position.

With this arrangement, the control valve device can be constituted by combining two three-position directional control valves which are general-use products without using four-position directional control valves each having a complicated structure, for example. The control valve device can stop the operation of the hoist cylinder and maintain the loading platform at the current position by setting both the first and second directional control valves at the neutral position. The control valve device can extend the hoist cylinder and raise the loading platform by switching the both first and second directional control valves to the raising position. On the other hand, the control valve device can contract the hoist cylinder and allow free fall of the loading platform by the weight of the loading platform by switching the first directional control valve to the floating position and by maintaining the second directional control valve at the neutral position. Moreover, the control valve device can contract the hoist cylinder by hydraulic force so as to lower the loading platform by maintaining the first directional control valve at the neutral position and by switching the second directional control valve to the lowering position.

MODE FOR CARRYING OUT THE INVENTION

Hereinafter, a conveyance vehicle according to an embodiment of the present invention will be described below in detail in accordance with the attached drawings by using a dump truck for transporting crushed stones and the like mined in a mine or the like as an example.

Designated at 1 is the dump truck which is a large-sized conveyance vehicle. The dump truck 1 is largely composed of an automotive vehicle body 2 having a solid frame structure and a vessel 3 as a loading platform mounted on the vehicle body 2 capable of moving up/down.

The vessel 3 is formed as a large-sized container having a whole length of as long as 10 to 13 m (meters) in order to load a large quantity of an objects to be transported such as crushed stones and the like, for example (hereinafter referred to as a crushed stone 4). A rear side 3A on a bottom portion of the vessel 3 is pin-connected by using a connecting pin 5 to the rear side of the vehicle body 2, while the front side 3B of the vessel 3 is rotationally moved in an upward and downward direction using the connecting pin 5 as a fulcrum. On the upper front side of the vessel 3, a protector 3C extending horizontally toward the front and covering a cab 12 and the like which will be described later is integrally provided from above.

In the vessel 3, its front side 3B is rotationally moved between a transport position shown in FIG. 1 and a soil discharging position shown in FIG. 2 by using the connecting pin 5 as a fulcrum by extending or contracting a hoist cylinder 14 which will be described later. Therefore, if the vessel 3 is set at the soil discharging position, the front side 3B of the vessel 3 is raised upward, and the loaded crushed stone 4 slips down from the vessel 3 tilted rearward and discharged to a predetermined load collecting site.

Indicated at 6 is one of left and right front wheels (only the left side is shown) rotatably provided on the front side of the vehicle body 2, and the front wheel 6 constitutes a steering wheel steered by an operator of the dump truck 1. A front wheel side suspension 7 composed of a hydraulic buffer and the like, for example, is provided between the front part of the vehicle body 2 and the front wheel 6, and this front wheel side suspension 7 supports the front side of the vehicle body 2 between the front wheel 6 and itself.

Indicated at 8 is one of the left and right rear wheels (only the left side is shown) rotatably provided on the rear side of the vehicle body 2, and the rear wheel 8 constitutes a driving wheel of the dump truck 1 and is rotated and driven by a travel drive device (not shown). A rear wheel side suspension 9 composed of a hydraulic buffer and the like, for example, is provided between the rear part of the vehicle body 2 and the rear wheel 8, and this rear wheel side suspension 9 supports the rear side of the vehicle body 2 between the rear wheel 8 and itself.

A floor 10 is located on the upper side of the front wheel 6 and provided on the front side of the vehicle body 2. The floor 10 forms a flat passage surface or the like on the upper front side of the vehicle body 2, and the cab 12 and the like which will be described later are installed on the upper side of the floor 10.

A ladder 11 is provided on the front surface side of the vehicle body 2 and extends by diagonally tilting from the lower front side of the vehicle body 2 to the front side of the floor 10. This ladder 11 constitutes steps (stairs) when the operator or the like gets on/off the floor 10.

The cab 12 is provided on the floor 10 of the vehicle body 2 and defines an operator's cab. Here, inside the cab 12, an operator's seat, a steering wheel, a start switch for starting/stopping an engine 13 which will be described later, an accelerator pedal, a brake pedal, an operating lever for remote control of a control valve device 20 which will be described later and the like (none of them is shown) are provided.

Indicated at 13 is an engine as a motor located on the lower side of the floor 10 and provided in the vehicle body 2. This engine 13 is constituted by using a large-sized diesel engine and the like, for example, and is accommodated in the vehicle body 2. The engine 13 is started/stopped by operating the start switch by the operator who got on into the cab 12, and a hydraulic pump 15 and the like which will be described later are rotated and driven during the operation.

Figure 3:
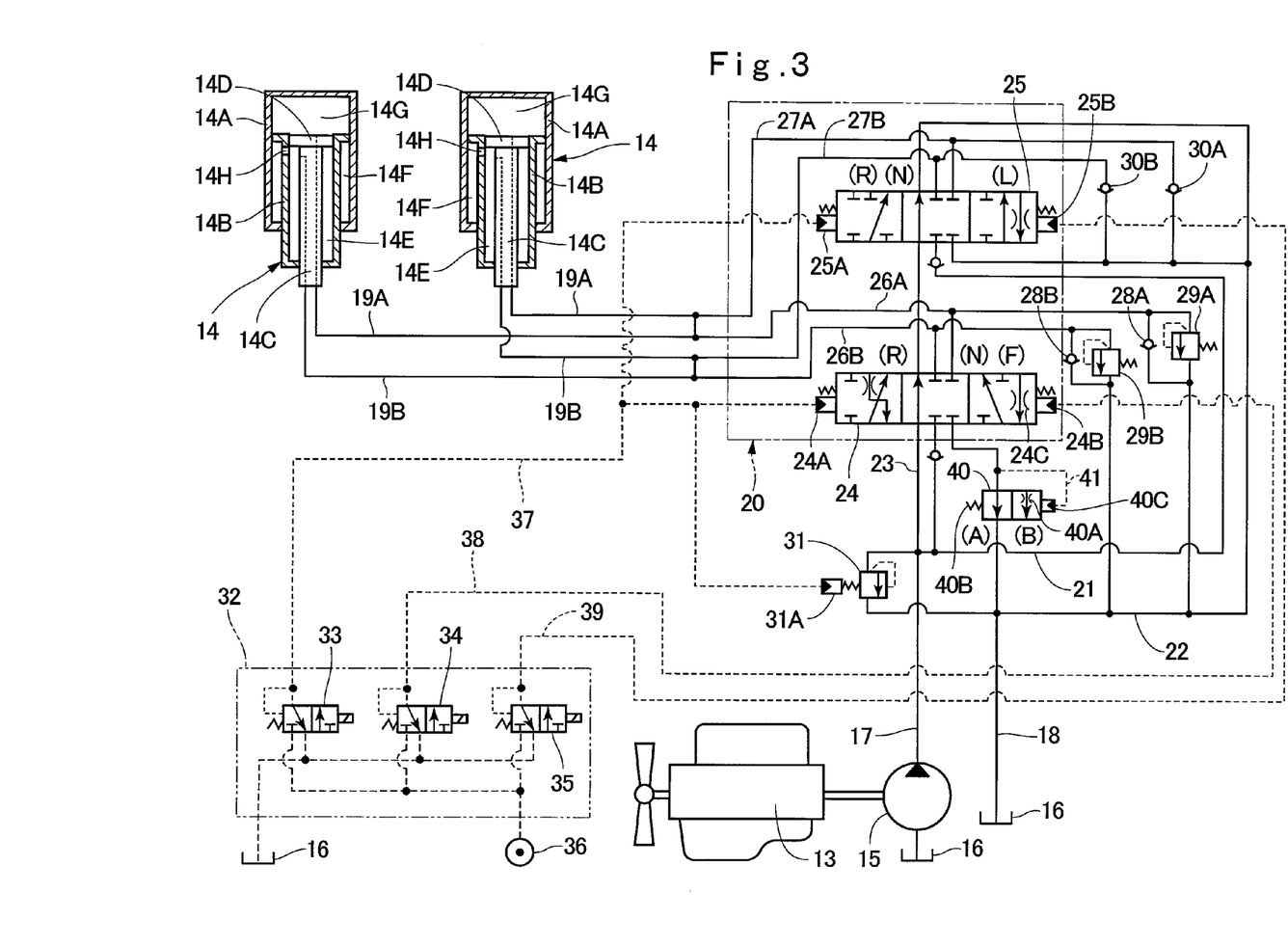
FIG. 3 is a hydraulic circuit diagram showing a circuit configuration for extending/contracting a hoist cylinder of the dump truck.

Indicated at 14 is one of a pair of left and right hoist cylinders provided capable of extension/contraction between the vehicle body 2 and the vessel 3. As shown in FIG. 3, each of these hoist cylinders 14 is constituted by a multistage (two-stage, for example) hydraulic cylinder and is composed of an outer tube portion 14A located on the outside, an inner tube portion 14B provided capable of extension/contraction in the outer tube portion 14A, a piston rod 14C and a piston 14D provided capable of extension/contraction in the inner tube portion 14B. The inside of the outer tube portion 14A of the hoist cylinder 14 is divided into three chambers, that is, rod side oil chambers 14E and 14F and a bottom side oil chamber 14G by the inner tube portion 14B, the piston rod 14C, and the piston 14D.

The rod side oil chamber 14F is made to communicate with either of the rod side oil chamber 14E and the bottom side oil chamber 14G through a port 14H provided in the inner tube portion 14B. That is, the piston 14D of the hoist cylinder 14 is slidingly displaced in an axial direction (vertical direction) in the inner tube portion 14B, and if the piston 14D is located above the port 14H, the rod side oil chamber 14F communicates with the rod side oil chamber 14E through the port 14H. On the other hand, if the piston 14D is displaced to a position below the port 14H, the rod side oil chamber 14F communicates with the bottom side oil chamber 14G through the port 14H.

Here, in the hoist cylinder 14, if a pressurized oil is supplied into the bottom side oil chamber 14G from the hydraulic pump 15 which will be described later, the inner tube portion 14B extends downward together with the piston rod 14C. If the inner tube portion 14B extends to the maximum, only the piston rod 14C further extends downward. As a result, the hoist cylinder 14 raises the front side 3B of the vessel 3 by using the connecting pin 5 as a fulcrum and rotationally moves the vessel 3 to the soil discharging position (position in FIG. 2).

On the other hand, in the hoist cylinder 14, if the pressurized oil is supplied into the rod side oil chamber 14E from the hydraulic pump 15 in a state in which the piston rod 14C extends to the maximum, first, only the piston rod 14C contracts into the inner tube portion 14B. Subsequently, the inner tube portion 14B contracts into the outer tube portion 14A together with the piston rod 14C. As a result, the hoist cylinder 14 lowers the front side 3B of the vessel 3 by using the connecting pin 5 as a fulcrum and rotationally moves the vessel 3 to the transport position (position in FIG. 1) where the vessel 3 is seated on the vehicle body 2.

Figure 4:
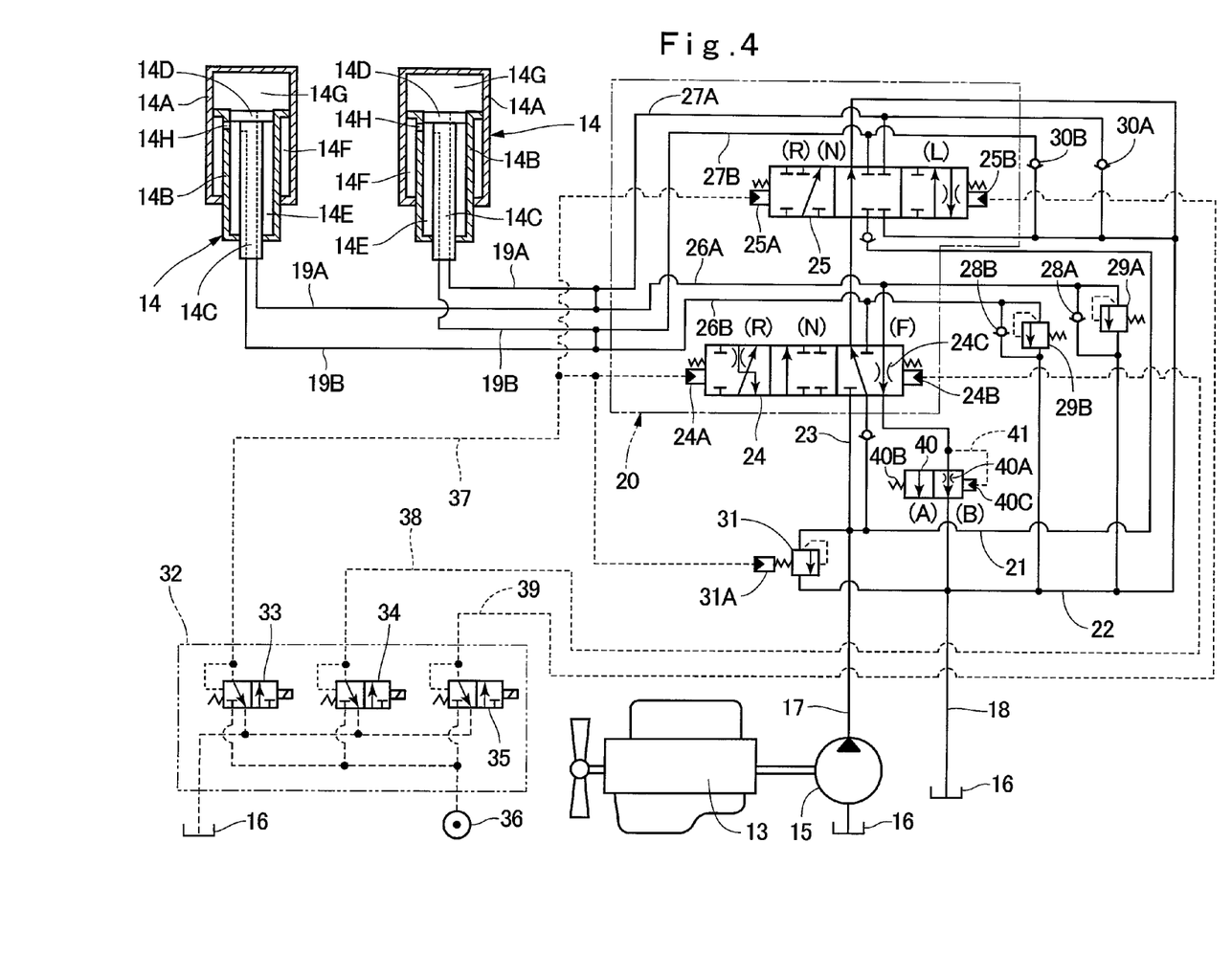
FIG. 4 is a hydraulic circuit diagram showing a state in which the loading platform with a large weight is allowed to freely fall with a control valve device set at a floating position.
Figure 5:
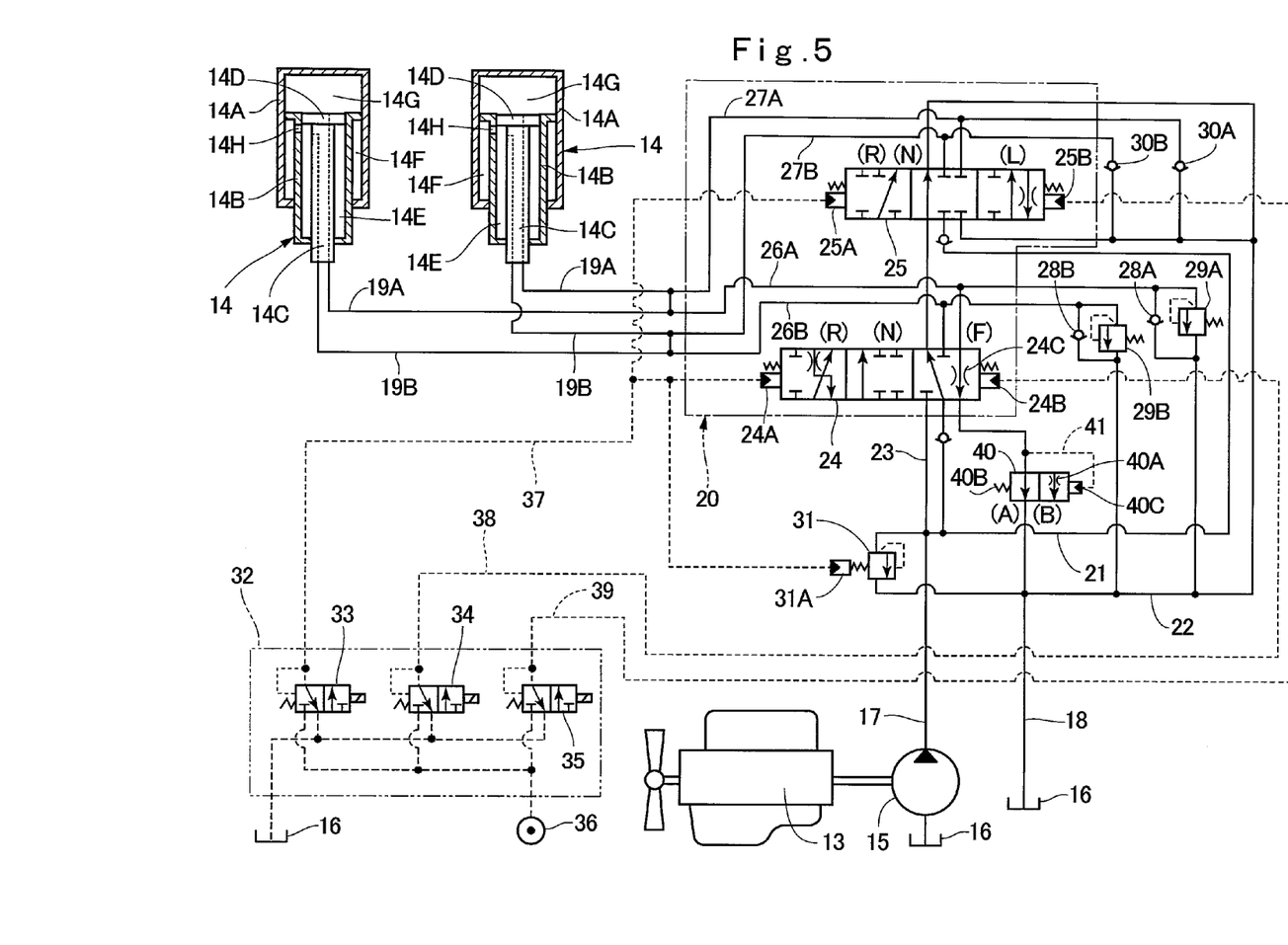
FIG. 5 is a hydraulic circuit diagram showing a state in which the loading platform with a small weight is allowed to freely fall with a control valve device set at a floating position.

Next, a hydraulic circuit for driving the hoist cylinder 14 will be described by referring to FIGS. 3 to 5.

Designated at 15 is a main hydraulic pump driven by the engine 13. This hydraulic pump 15 constitutes a hydraulic power source for supplying the pressurized oil for operation to the hoist cylinder 14 together with the tank 16 storing the operating oil. In this case, as shown in FIG. 1, the tank 16 is located below the vessel 3 and mounted on a side surface of the vehicle body 2 or the like.

The operating oil stored in the tank 16 is delivered into a pump line 17 from the delivery side of the hydraulic pump 15 rotated and driven by the engine 13. A return oil from the hoist cylinder 14 is discharged into the tank 16 through a tank line 18.

Indicated at 19A is a hydraulic conduit connected to the bottom side oil chamber 14G of the hoist cylinder 14. Indicated at 19B is a hydraulic conduit connected to the rod side oil chamber 14E of the hoist cylinder 14. One hydraulic conduit 19A has its base end side connected to the hydraulic power source composed of the hydraulic pump 15 and the tank 16 through the control valve device 20 which will be described later and the distal end side connected to the bottom side oil chamber 14G through the piston rod 14C of the hoist cylinder 14. The other hydraulic conduit 19B has its base end side connected to the hydraulic power source through the control valve device 20 and the distal end side connected to the rod side oil chamber 14E through the piston rod 14C of the hoist cylinder 14.

Therefore, the hydraulic conduit 19A supplies the pressurized oil delivered from the hydraulic pump 15 to the bottom side oil chamber 14G of the hoist cylinder 14 through the control valve device 20. The hydraulic conduit 19B supplies the pressurized oil delivered from the hydraulic pump 15 to the rod side oil chamber 14E of the hoist cylinder 14 through the control valve device 20. On the other hand, the pressurized oil in the bottom side oil chamber 14G, the rod side oil chamber 14E, and the rod side oil chamber 14F is discharged into the tank 16 through either one of the hydraulic conduits 19A and 19B.

Subsequently, designated at 20 is the control valve device provided between the hydraulic power source composed of the hydraulic pump 15 and the tank 16 and the hoist cylinder 14. The control valve device 20 is to control supply and discharge of the pressurized oil with respect to the hoist cylinder 14 and includes a high pressure side oil passage 21, a low pressure side oil passage 22, a bypass oil passage 23, a first directional control valve 24, a second directional control valve 25 and the like. The first directional control valve 24 and the second directional control valve 25 are parallel-connected to each other through the high pressure side oil passage 21, the low pressure side oil passage 22, and the bypass oil passage 23.

The high pressure side oil passage 21 is connected to the delivery side of the hydraulic pump 15 through the pump line 17. The low pressure side oil passage 22 is connected to the tank 16 through the tank line 18. As shown in FIG. 3, the bypass oil passage 23 makes the high pressure side oil passage 21 and the low pressure side oil passage 22 communicate with each other if the first directional control valve 24 and the second directional control valve 25 are at neutral position (N). As a result, the hydraulic pump 15 is brought into an unload state, and a delivery pressure (a pressure in the pump line 17) is kept at a low pressure state close to a tank pressure.

On the output side of the first directional control valve 24, a pair of actuator side oil passages 26A and 26B are provided. The actuator side oil passage 26A is connected to the bottom side oil chamber 14G of the hoist cylinder 14 through the hydraulic conduit 19A. The actuator side oil passage 26B is connected to the rod side oil chamber 14E of the hoist cylinder 14 through the hydraulic conduit 19B.

On the output side of the second directional control valve 25, a pair of actuator side oil passages 27A and 27B are provided. The actuator side oil passage 27A is connected to the bottom side oil chamber 14G of the hoist cylinder 14 through the hydraulic conduit 19A. The actuator side oil passage 27B is connected to the rod side oil chamber 14E of the hoist cylinder 14 through the hydraulic conduit 19B.

The first directional control valve 24 is constituted by a hydraulic pilot type directional control valve with 6 ports and 3 positions, for example, and has a pair of hydraulic pilot portions 24A and 24B. If a pilot pressure is supplied to the hydraulic pilot portion 24A, the first directional control valve 24 is switched from the neutral position (N) to the raising position (R). On the other hand, if the pilot pressure is supplied to the hydraulic pilot portion 24B, the first directional control valve is switched from the neutral position (N) to the floating position (F).

Here, a throttle 24C is provided at the floating position (F) of the first directional control valve 24. If the pressurized oil in the bottom side oil chamber 14G of the hoist cylinder 14 flows to the tank 16 side through the first directional control valve 24, this throttle 24C gives a throttling action to this pressurized oil by switching the first directional control valve 24 to the floating position (F).

The second directional control valve 25 is also constituted by a hydraulic pilot type directional control valve with 6 ports and 3 positions, for example, and has a pair of hydraulic pilot portions 25A and 25B. If a pilot pressure is supplied to the hydraulic pilot portion 25A, the second directional control valve 25 is switched from the neutral position (N) to the raising position (R). On the other hand, if the pilot pressure is supplied to the hydraulic pilot portion 25B, the second directional control valve is switched from the neutral position (N) to the lowering position (L).

Here, when the control valve device 20 is set at the neutral position, as shown in FIG. 3, the first and second directional control valves 24 and 25 are both maintained at the neutral position (N), and supply and discharge of the pressurized oil to the hoist cylinder 14 is stopped. As a result, the control valve device 20 is at the neutral position where the operation of the hoist cylinder 14 is stopped. Therefore, the vessel 3 maintains the position (attitude) when the first and second directional control valves 24 and 25 are at the neutral position (N).

Subsequently, when the control valve device 20 is set at the raising position, the first and second directional control valves 24 and 25 are switched from the neutral position (N) to the raising position (R). If the first directional control valve 24 is switched to the raising position (R), the pressurized oil from the hydraulic pump 15 is supplied into the bottom side oil chamber 14G of the hoist cylinder 14 through the pump line 17, the first directional control valve 24, the actuator side oil passage 26A, and the hydraulic conduit 19A. On the other hand, the pressurized oil in the rod side oil chambers 14E and 14F of the hoist cylinder 14 is discharged into the tank 16 through the hydraulic conduit 19B, the actuator side oil passage 26B, the first directional control valve 24, the flow control valve 40 which will be described later, and the tank line

18. If the second directional control valve 25 is switched to the raising position (R), the pressurized oil from the hydraulic pump 15 is supplied into the bottom side oil chamber 14G of the hoist cylinder 14 through the pump line 17, the high pressure side oil passage 21, the second directional control valve 25, the actuator side oil passage 27A, and the hydraulic conduit 19A.

Figure 2:
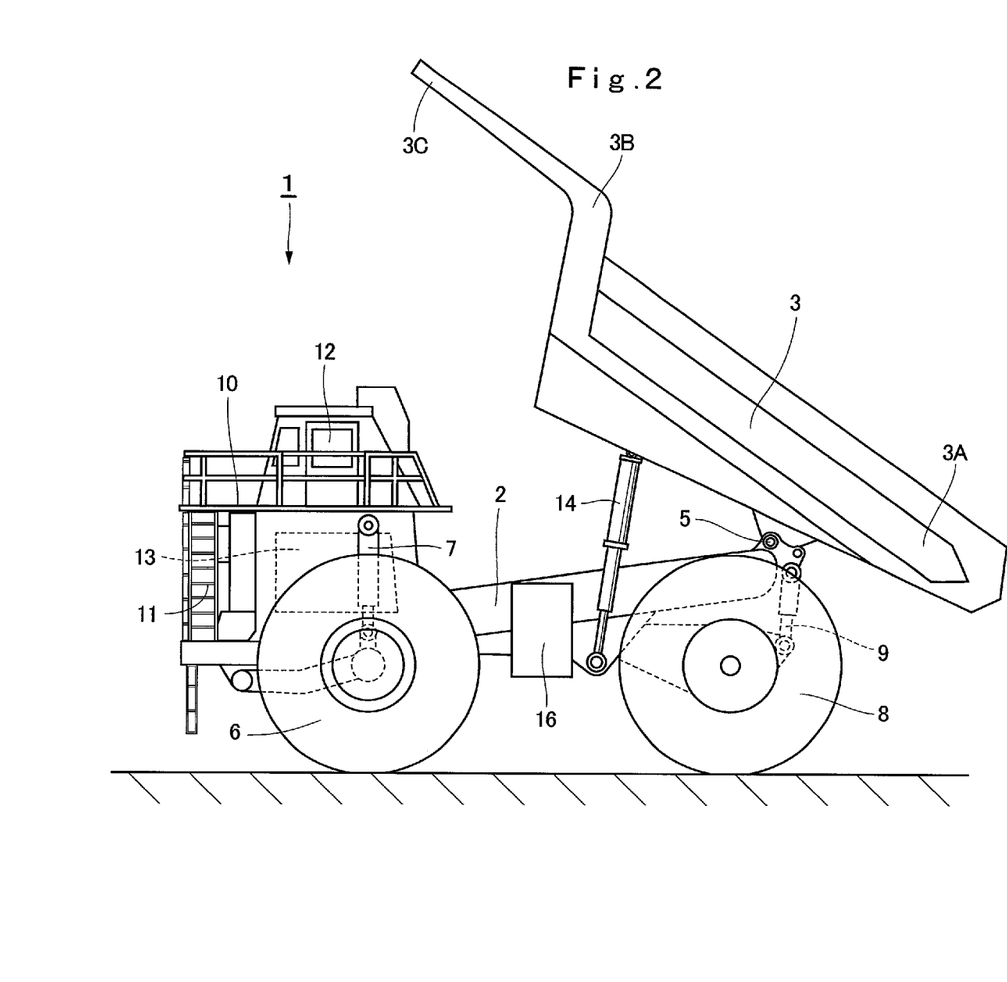
FIG. 2 is a front view showing a state in which the loading platform of the dump truck is raised to a soil discharging position.

As a result, the control valve device 20 is set at the raising position where the hoist cylinder 14 is extended and the vessel 3 is rotationally moved upward, and the vessel 3 rises to the soil discharging position shown in FIG. 2 and discharges the loaded crushed stone 4.

Subsequently, when the control valve device 20 is set at the lowering position, the first directional control valve 24 is returned to the neutral position (N) and the second directional control valve 25 is switched to the lowering position (L). If the second directional control valve 25 is switched to the lowering position (L), the pressurized oil from the hydraulic pump 15 is supplied into the rod side oil chambers 14E and 14F of the hoist cylinder 14 through the pump line 17, the high pressure side oil passage 21, the second directional control valve 25, the actuator side oil passage 27B, and the hydraulic conduit 19B. On the other hand, the pressurized oil in the bottom side oil chamber 14G is discharged into the tank 16 through the hydraulic conduit 19A, the actuator side oil passage 27A, the second directional control valve 25, the low pressure side oil passage 22, and the tank line 18.

Figure 1:
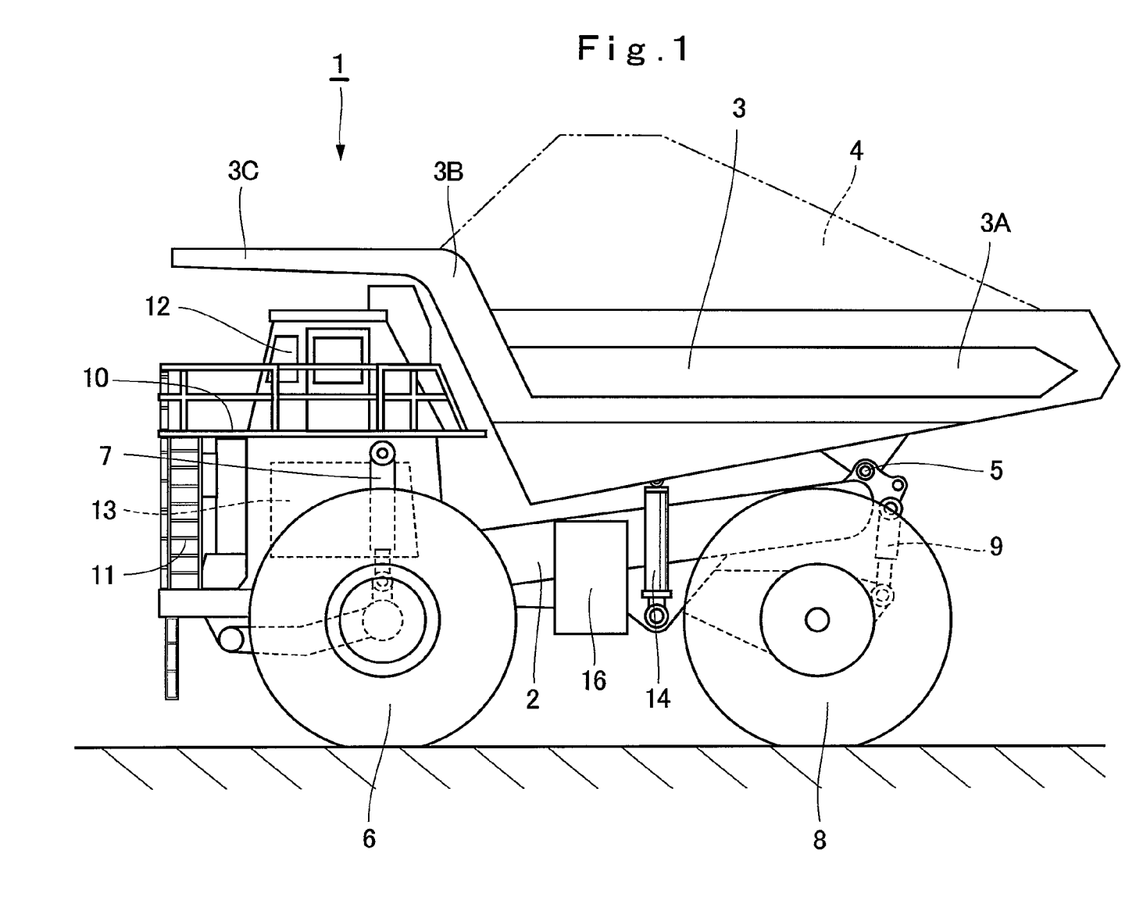
FIG. 1 is a front view showing a dump truck according to an embodiment of the present invention in a state in which a loading platform is at a transport position.

As a result, the control valve device 20 is set at the lowering position where the hoist cylinder 14 is contracted and the vessel 3 is rotationally moved downward, and the vessel 3 moves to the transport position shown in FIG. 1 and is seated on the vehicle body 2.

When the control valve device 20 is set at the floating position, the first directional control valve 24 is switched to the floating position (F) and the second directional control valve 25 is returned to the neutral position (N). If the first directional control valve 24 is switched to the floating position (F), the actuator side oil passage 26A is connected to the tank line 18 through the first directional control valve 24 and the flow control valve 40. On the other hand, the actuator side oil passage 26B is connected to the low pressure side oil passage 22 and the tank line 18 through a check valve 28B which will be described later. The actuator side oil passage 27B is connected to the low pressure side oil passage 22 and the tank line 18 through the check valve 30B which will be described later.

The pressurized oil in the bottom side oil chamber 14G of the hoist cylinder 14 is discharged into the tank 16 through the hydraulic conduit 19A, the actuator side oil passage 26A, the first directional control valve 24, the flow control valve 40, and the tank line 18. On the other hand, the operating oil in the tank 16 can be supplied to the rod side oil chambers 14E and 14F of the hoist cylinder 14 through the tank line 18, the low pressure side oil passage 22, a check valves 28B and 30B which will be described later, the actuator side oil passages 26B and 27B, and the hydraulic conduit 19B.

As a result, the control valve device 20 is set at the floating position allowing free fall of the vessel 3, and the vessel 3 moves from the soil discharging position shown in FIG. 2 to the transport position shown in FIG. 1 by its own weight. During running of the dump truck 1, by setting the control valve device 20 at the floating position, the vessel 3 can be seated on the vehicle body 2 by its own weight.

Indicated at 28A and 28B are the check valves for makeup disposed on the first directional control valve 24 side. The check valve 28A is provided between the actuator side oil passage 26A and the low pressure side oil passage 22 by bypassing the first directional control valve 24. The check valve 28B is provided between the actuator side oil passage 26B and the low pressure side oil passage 22 by bypassing the first directional control valve 24.

One check valve 28A allows the operating oil in the tank 16 to flow to the bottom side oil chamber 14G of the hoist cylinder 14 through the tank line 18, the low pressure side oil passage 22, the actuator side oil passage 26A, and the hydraulic conduit 19A and prevents an opposite flow. The other check valve 28B allows the operating oil in the tank 16 to flow to the rod side oil chamber 14E of the hoist cylinder 14 through the tank line 18, the low pressure side oil passage 22, the actuator side oil passage 26B, and the hydraulic conduit 19B and prevents an opposite flow.

As a result, when the control valve device 20 is set at the floating position, the operating oil in the tank 16 can be supplied to the bottom side oil chamber 14G, the rod side oil chambers 14E and 14F of the hoist cylinder 14, and the inside of each oil chamber can be prevented from being brought into a negative pressure.

Indicated at 29A and 29B are relief valves for preventing overload. The relief valve 29A is provided between the actuator side oil passage 26A and the low pressure side oil passage 22 by bypassing the first directional control valve 24. The relief valve 29B is provided between the actuator side oil passage 26B and the low pressure side oil passage 22 by bypassing the first directional control valve 24.

One relief valve 29A is connected in parallel with the check valve 28A and is opened in order to relieve an excessive pressure on the bottom side oil chamber 14G side when an overload in a contracting direction acts on the hoist cylinder 14. Moreover, the other relief valve 29B is connected in parallel with the check valve 28B and is opened in order to relieve an excessive pressure on the rod side oil chamber 14E side when an overload in an extending direction acts on the hoist cylinder 14.

Indicated at 30A and 30B are check valves for makeup disposed on the second directional control valve 25 side. The check valve 30A is provided between the actuator side oil passage 27A and the low pressure side oil passage 22 by bypassing the second directional control valve 25. The check valve 303 is provided between the actuator side oil passage 27B and the low pressure side oil passage 22 by bypassing the second directional control valve 25.

One check valve 30A allows the operating oil in the tank 16 to flow into the bottom side oil chamber 14G of the hoist cylinder 14 through the tank line 18, the low pressure side oil passage 22, the actuator side oil passage 27A, and the hydraulic conduit 19A and prevents an opposite flow. The other check valve 30B allows the operating oil in the tank 16 to flow to the rod side oil chamber 14E of the hoist cylinder 14 through the tank line 18, the low pressure side oil passage 22, the actuator side oil passage 27B, and the hydraulic conduit 19B and prevents an opposite flow.

As a result, when the control valve device 20 is set at the floating position, the operating oil in the tank 16 can be supplied to the bottom side oil chamber 14G, the rod side oil chambers 14E and 14F of the hoist cylinder 14 and can prevent the inside of each oil chamber from being brought into a negative pressure.

Indicated at 31 is a relief valve capable of changing a relief set pressure provided between the high pressure side oil passage 21 and the low pressure side oil passage 22. The relief valve 31 is to determine a maximum delivery pressure of the hydraulic pump 15 and if a pressure larger than that occurs, the relief valve relieves it as an excessive pressure to the tank 16 side. The relief valve 31 has a set pressure variable portion 31A for switching the relief set pressure between a low pressure setting and a high pressure setting.

Here, the set pressure variable portion 31A of the relief valve 31 sets the delivery pressure of the hydraulic pump 15 to a high pressure by switching the relief set pressure of the relief valve 31 to the high pressure setting if a pilot pressure is supplied from a solenoid valve 33 which will be described later through a pilot conduit 37 and the first and second directional control valves 24 and 25 are switched to the raising position (R).

On the other hand, if the supply of the pilot pressure is stopped and the first and second directional control valves 24 and 25 are switched to the switching position other than the raising position (R), that is, the neutral position (N), the floating position (F) or the lowering position (L), the relief set pressure of the relief valve 31 is switched to the low pressure setting by the set pressure variable portion 31A. At this time, the delivery pressure of the hydraulic pump 15 is set at a relatively low pressure so as to prevent the pressure of the pressurized oil from becoming high more than necessary.

Designated at 32 is a pilot pressure supply portion for supplying the pilot pressure to the first and second directional control valves 24 and 25. The pilot pressure supply portion 32 includes three solenoid valves 33, 34 and 35, for example. These solenoid valves 33 to 35 are composed of a proportional control type solenoid valves for variably controlling the pilot pressure. The solenoid valves 33 to 35 have their high voltage side connected to a pilot hydraulic power source 36 and a low voltage side connected to the tank 16.

Here, the solenoid valve 33 has its output side connected to the hydraulic pilot portions 24A and 25A of the first and second directional control valves 24 and 25 through the pilot conduit 37. The output side of the solenoid valve 34 is connected to the hydraulic pilot portion 24B of the first directional control valve 24 through a pilot conduit 38. The output side of the solenoid valve 35 is connected to the hydraulic pilot portion 25B of the second directional control valve 25 through a pilot conduit 39.

In the cab 12 of the dump truck 1, an operating lever (not shown) is provided, and this operating lever is tilted and operated by the operator in the cab 12. As a result, any one of the solenoid valves 33 to 35 is selectively switched, and a pilot pressure in proportion with an operation amount of the pilot conduits 37, 38 or 39 is generated.

That is, if the solenoid valve 33 is switched and the pilot pressure is generated in the pilot conduit 37, the first and second directional control valves 24 and 25 are switched from the neutral position (N) to the raising position (R). If the solenoid valve 34 is switched, the pilot pressure is generated in the pilot conduit 38, and the first directional control valve 24 is switched from the neutral position (N) to the floating position (F). If the solenoid valve 35 is switched, the pilot pressure is generated in the pilot conduit 39, and the second directional control valve 25 is switched from the neutral position (N) to the lowering position (L).

Next, the flow control valve used in this embodiment will be described.

Designated at 40 is the flow control valve located between the first directional control valve 24 and the tank 16 and provided in the middle of the tank line 18. The flow control valve 40 controls the flow rate of the pressurized oil discharged into the tank 16 from the hoist cylinder 14 through the first directional control valve 24 and the like when the control valve device 20 is at the floating position.

Here, the flow control valve 40 is formed of a directional control valve with two ports and two positions having a communicating position (A) and a throttling position (B), and a throttle 40A is provided at the throttling position (B). This flow control valve 40 maintains the communicating position (A) by a valve spring 40B all the time (See, FIG. 3). On a hydraulic pilot portion 40C of the flow control valve 40, a pressure on the inlet side discharged from the floating position (F) of the first directional control valve 24 and flowing into the flow control valve 40 acts through a pilot line 41.

The flow control valve 40 maintains the communicating position (A) if the pressure of the pressurized oil flowing out of the first directional control valve 24 is at a predetermined pressure or less, that is, if it is an urging force or less of the valve spring 40B, for example. On the other hand, if the pressure of the pressurized oil flowing out of the first directional control valve 24 exceeds the predetermined pressure, that is, if it exceeds the urging force of the valve spring 40B, for example, the flow control valve 40 is switched to the throttling position (B).

That is, by switching the first directional control valve 24 to the floating position (F) and by returning the second directional control valve 25 to the neutral position (N), the control valve device 20 is set at the floating position, and the vessel 3 can freely fall by its own weight. Here, if a large quantity of the crushed stone 4 is loaded in the vessel 3, for example, the weight of the vessel 3 is large, and the falling speed is also high. In this case, the pilot pressure acting on the hydraulic pilot portion 40C of the flow control valve 40 becomes larger than the predetermined pressure and exceeds the urging force of the valve spring 40B, and the flow control valve 40 is switched from the communicating position (A) to the throttling position (B) as shown in FIG. 4.

In this state, the throttle 24C provided at the floating position (F) of the first directional control valve 24 and the throttle 40A provided at the throttling position (B) of the flow control valve 40 are connected in series. As a result, a throttling action added with the throttle 24C of the first directional control valve 24 and the throttle 40A of the flow control valve 40 can be given to the pressurized oil discharged into the tank 16 from the hoist cylinder 14 through the first directional control valve 24 and the flow control valve 40. Therefore, the flow rate of the pressurized oil discharged into the tank 16 decreases.

As described above, if the weight of the vessel 3 is large, an impact received when the vessel 3 is seated on the vehicle body 2 becomes large. Thus, the throttle 24C of the first directional control valve 24 and the throttle 40A of the flow control valve 40 are connected in series while the flow control valve 40 is set at the throttling position (B). As a result, by decreasing the flow rate of the pressurized oil discharged from the hoist cylinder 14, it is configured such that the falling speed of the vessel 3 is lowered and the vessel 3 is seated on the vehicle body 2 slowly.

On the other hand, in the state in which the vessel 3 is allowed to freely fall by its own weight, if the crushed stone 4 is not loaded in the vessel 3, for example, the weight of the vessel 3 is small, and the falling speed is also low. In this case, the pilot pressure acting on the hydraulic pilot portion 40C of the flow control valve 40 falls to the predetermined pressure or less, that is, to the urging force of the valve spring 40B or less, and as shown in FIG. 5, the flow control valve 40 returns to the communicating position (A). As a result, throttling does not act on the pressurized oil discharged into the tank 16 from the hoist cylinder 14 through the first directional control valve 24, the flow control valve 40 and the like, and the flow rate of this pressurized oil increases.

As described above, if the weight of the vessel 3 is small, the impact received when the vessel 3 is seated on the vehicle body 2 is small. Thus, by increasing the flow rate of the pressurized oil discharged from the hoist cylinder 14 while the flow control valve 40 is set at the communicating position (A), it is configured such that the vessel 3 is made to freely fall rapidly and is seated on the vehicle body 2.

The dump truck 1 according to this embodiment has the configuration as described above and its operation will be described below.

At a quarry such as a mine and the like, the crushed stone 4 as an objects to be transported is loaded on the vessel 3 of the dump truck 1 by using a large sized hydraulic excavator (not shown). The dump truck 1 runs to the load collecting site in a state in which the crushed stone 4 is loaded on the vessel 3.

After the dump truck 1 arrives at the load collecting site, the operator in the cab 12 tilts and operates the operating lever (not shown) so as to excite and switch the solenoid valve 33 shown in FIG. 3. Thus, the pilot pressure from the pilot hydraulic power source 36 is supplied to the hydraulic pilot portions 24A and 25A of the first and second directional control valves 24 and 25 through the pilot conduit 37.

Therefore, the first and second directional control valves 24 and 25 are switched from the neutral position (N) to the raising position (R), and the control valve device 20 is set at the raising position. Thus, the pressurized oil from the hydraulic pump 15 is supplied into the bottom side oil chamber 14G of the hoist cylinder 14 through the pump line 17, the high pressure side oil passage 21, the first and second directional control valves 24 and 25, the actuator side oil passages 26A and 27A, and the hydraulic conduit 19A. On the other hand, the pressurized oil in the rod side oil chambers 14E and 14F is discharged into the tank 16 through the hydraulic conduit 19B, the actuator side oil passage 26B, the first directional control valve 24, the flow control valve 40, and the tank line 18.

As a result, the piston rod 14C and the inner tube portion 14B of the hoist cylinder 14 extend by the pressurized oil supplied to the bottom side oil chamber 14G and raises the vessel 3 to the soil discharging position as shown in FIG. 2. At this time, the front side 3B of the vessel 3 rotationally moves upward by using the connecting pin 5 as a fulcrum and takes a tilted attitude shown in FIG. 2, and the loaded crushed stone 4 can be discharged to the load collecting site.

If the operator takes the hand off the operating lever (not shown), the solenoid valve 33 is demagnetized and returns to the position in FIG. 3, and the other solenoid valves 34 and 35 are also maintained at the positions in FIG. 3. As a result, the first and second directional control valves 24 and 25 are returned from the raising position (R) to the neutral position (N), and the control valve device 20 is set at the neutral position.

Thus, supply and discharge of the pressurized oil with respect to the bottom side oil chamber 14G and the rod side oil chambers 14E and 14F of the hoist cylinder 14 are stopped. As a result, the piston rod 14C and the inner tube portion 14B can be kept in the extended state, and the vessel 3 can be stopped in the tilted attitude shown in FIG. 2.

When the discharge work of the crushed stone 4 is finished and the operator tilts and operates the operating lever so as to excite and switch the solenoid valve 34 shown in FIG. 3, the pilot pressure from the pilot hydraulic power source 36 is supplied to the hydraulic pilot portion 24B of the first directional control valve 24 through the pilot conduit 38. As a result, the first directional control valve 24 is switched from the neutral position (N) to the floating position (F), the second directional control valve 25 maintains the neutral position (N), and the control valve device 20 is set at the floating position.

Thus, the bottom side oil chamber 14G of the hoist cylinder 14 is connected to the tank 16 through the hydraulic conduit 19A, the actuator side oil passage 26A, the first directional control valve 24, the flow control valve 40, and the tank line 18. On the other hand, the rod side oil chamber 14E of the hoist cylinder 14 is connected to the tank 16 through the hydraulic conduit 19B, the actuator side oil passages 26B and 27B, the check valves 28B and 30B, the low pressure side oil passage 22, and the tank line 18.

As a result, the hoist cylinder 14 contracts by the weight of the vessel 3, and the pressurized oil in the bottom side oil chamber 14G is discharged into the tank 16 through the hydraulic conduit 19A, the actuator side oil passage 26A, the first directional control valve 24, the flow control valve 40, and the tank line 18. On the other hand, the operating oil in the tank 16 is supplied into the rod side oil chambers 14E and 14F through the check valves 28B and 30B, the actuator side oil passages 26B and 27B, and the hydraulic conduit 19B. As a result, the vessel 3 can be made to freely fall from the soil discharging position shown in FIG. 2 to the transport position shown in FIG. 1 by its own weight, and the vessel 3 can be seated on the vehicle body 2 at the transport position.

Here, in a state in which the crushed stone 4 is left in the vessel 3, for example, if the vessel 3 is to be made to freely fall from the soil discharging position to the transport position by its own weight, the weight of the vessel 3 is large and the falling speed is also high. In this case, the pilot pressure acting on the hydraulic pilot portion 40C of the flow control valve 40 through the pilot line 41 exceeds the urging force of the valve spring 40B so that the flow control valve 40 is switched from the communicating position (A) to the throttling position (B) (See, FIG. 4). Thus, the throttle 24C of the first directional control valve 24 and the throttle 40A of the flow control valve 40 are connected in series. Therefore, the throttling action added with the throttle 24C of the first directional control valve 24 and the throttle 40A of the flow control valve 40 can be given to the pressurized oil discharged into the tank 16 from the hoist cylinder 14 through the first directional control valve 24 and the flow control valve 40, and the flow rate of the pressurized oil discharged into the tank 16 from the hoist cylinder 14 can be decreased. As a result, the falling speed of the vessel 3 can be lowered and the vessel 3 can be seated on the vehicle body 2 slowly, and the impact received when the vessel 3 is seated on the vehicle body 2 can be suppressed.

On the other hand, if all the crushed stones 4 loaded on the vessel 3 are discharged, the weight of the vessel 3 is small, and the falling speed is also low. In this case, the pilot pressure acting on the hydraulic pilot portion 40C of the flow control valve 40 falls to the urging force of the valve spring 40B or less, and the flow control valve 40 returns to the communicating position (A) (See, FIG. 5). Thus, the pressurized oil in the hoist cylinder 14 is discharged into the tank 16 through the flow control valve 40 at the communicating position (A) without its flow rate being limited. As a result, the vessel 3 can be made to freely fall rapidly, and time required for moving the vessel 3 from the soil discharging position to the transport position can be reduced.

It should be noted that if the dump truck 1 is in a tilted state due to irregularity of a work site, an inclined place or the like, the vessel 3 might not fall by its own weight even if the control valve device 20 is set at the floating position. In such a case, when the operator tilts and operates the operating lever so as to switch the solenoid valve 35, the pilot pressure from the pilot hydraulic power source 36 is supplied to the hydraulic pilot portion 25B of the second directional control valve 25 through the pilot conduit 39. As a result, the first directional control valve 24 returns to the neutral position (N), the second directional control valve 25 is switched to the lowering position (L), and the control valve device 20 is set at the lowering position.

As a result, the pressurized oil from the hydraulic pump 15 is supplied into the rod side oil chambers 14E and 14F of the hoist cylinder 14 through the pump line 17, the high pressure side oil passage 21, the second directional control valve 25, the actuator side oil passage 27B, and the hydraulic conduit 19B. On the other hand, the pressurized oil in the bottom side oil chamber 14G of the hoist cylinder 14 is discharged into the tank 16 through the hydraulic conduit 19A, the actuator side oil passage 27A, the second directional control valve 25, the low pressure side oil passage 22, and the tank line 18.

As a result, in the hoist cylinder 14, the inner tube portion 14B contracts into the outer tube portion 14A together with the piston rod 14C by the pressurized oil supplied into the rod side oil chambers 14E and 14F. As a result, the vessel 3 can be rotationally moved downward to the transport position shown in FIG. 1 by a hydraulic force of the hoist cylinder 14, and the vessel 3 can be forcedly seated on the vehicle body 2.

Thus, according to this embodiment, the flow control valve 40 is provided in the middle of the tank line 18 by being located between the first directional control valve 24 and the tank 16, and this flow control valve 40 controls the flow rate of the pressurized oil discharged into the tank 16 from the hoist cylinder 14 when the control valve device 20 is at the floating position.

Therefore, in case the weight of the vessel 3 is large due to the loaded crushed stone 4 when the vessel 3 is made to freely fall by its own weight by using the first directional control valve 24 as the floating position (F), the flow control valve 40 is switched to the throttling position (B). Therefore, the flow rate of the pressurized oil discharged into the tank 16 from the hoist cylinder 14 can be decreased, and the speed at which the vessel 3 freely falls can be lowered. As a result, the impact received when the vessel 3 is seated on the vehicle body 2 can be alleviated, and comfort in the cab 12 can be improved.

On the other hand, if the weight of the vessel 3 is small since the crushed stone 4 is discharged, the flow control valve 40 is returned to the communicating position (A). Therefore, the flow rate of the pressurized oil discharged into the tank 16 from the hoist cylinder 14 can be increased, and the speed at which the vessel 3 freely falls can be quickened. As a result, time until the vessel 3 is seated on the vehicle body 2 can be reduced, and workability of the earth discharge work using the dump truck 1 can be improved.

It should be noted that, in the aforementioned embodiment, the case in which the flow control valve 40 is switched to the communicating position (A) or the throttling position (B) in accordance with the pressure on the inlet side where pressurized oil flowing out from the first directional control valve 24 flows into the flow control valve 40 is exemplified. However, the present invention is not limited to the same, and a flow control valve switched to the communicating position and the throttling position by an operation by an operator, for example, may also be used.

In the aforementioned embodiment, the case in which the first directional control valve 24 is switched to three positions, that is, the neutral position (N), the raising position (R), and the floating position (F), and the second directional control valve 25 is switched to three positions, that is, the neutral position (N), the raising position (R), and the lowering position (L) is exemplified. However, the present invention is not limited to those using such two directional control valves but may be configured such that one directional control valve switched to four positions, that is, the neutral position (N), the raising position (R), the floating position (F), and the lowering position (L), for example, is used. In this case, a directional control valve described in Japanese Laid-open No. 2001-105954 A, for example, can be used as the directional control valve which can be switched to the four positions.

Moreover, in the aforementioned embodiment, the dump truck 1 in which the vessel 3 is mounted on the wheel type vehicle body 2 having the front wheel 6 and the rear wheel 8 is explained as an example. However, the present invention is not limited to the same and can be applied to a conveyance vehicle in which a vessel is mounted on a crawler type vehicle body, for example.

DESCRIPTION OF REFERENCE NUMERALS

1: Dump truck (Conveyance vehicle)
2: Vehicle body
3: Vessel (Loading platform)
3A: Rear side
3B: Front side
4: Crushed stone
14: Hoist cylinder
15: Hydraulic pump (Hydraulic power source)
16: Tank (Hydraulic power source)
20: Control valve device
24: First directional control valve
24C: Throttle
25: Second directional control valve
40: Flow control valve
40A: Throttle
40B: Valve spring
40C: Hydraulic pilot portion

The invention claimed is:
1. A conveyance vehicle comprising:
an automotive vehicle body;
a loading platform provided on said vehicle body for loading objects to be transported such that a front side is rotationally movable in upward and downward directions by using a rear side thereof as a fulcrum;
a hoist cylinder to extend and contract between said loading platform and said vehicle body and to rotationally move said loading platform upward by extending the hoist cylinder;
a hydraulic power source to supply pressurized oil to operate said hoist cylinder;
a tank to supply oil to said hydraulic power source;
a control valve device provided between said hydraulic power source and said hoist cylinder to control the supply and discharge of the pressurized oil to said hoist cylinder,
where said control valve device has a plurality of switching positions including a neutral position to stop movement of said hoist cylinder, a raising position where said hoist cylinder is extended by the pressurized oil to rotationally move said loading platform upward, a lowering position where said hoist cylinder is contracted by the pressurized oil to rotationally move said loading platform downward, and a floating position where said hoist cylinder is contracted by discharging the pressurized oil by the weight of said loading platform to allow said loading platform to free fall; and
a flow control valve provided between said control valve device and said tank to control a flow rate of the pressurized oil discharged from said hoist cylinder when said control valve device is at said floating position,
wherein a first throttle is provided at said floating position of said control valve device, and a second throttle provided at said flow control valve is connected in series to said first throttle to control the flow rate of the pressurized oil when the pressurized oil flowing out through said floating position of said control valve device exceeds a predetermined pressure.

2. The conveyance vehicle according to claim 1, wherein said flow control valve controls a flow rate of said pressurized oil in accordance with a pressure of the pressurized oil flowing out of said control valve device.

3. The conveyance vehicle according to claim 1, wherein said flow control valve has a communicating position where the pressurized oil from said hoist cylinder is discharged to said tank, a throttling position to throttle the pressurized oil discharged toward said tank with said second throttle, a valve spring to apply an urging force to said flow control valve toward said communicating position, and a hydraulic pilot portion to receive a pilot pressure from the pressurized oil flowing out of said control valve device, and said flow control valve is switched from said communicating position to said throttling position by said hydraulic pilot portion when the pressure of the pressurized oil flowing out of said control valve device exceeds said urging force of said valve spring.

4. The conveyance vehicle according to claim 3, wherein when said control valve device is switched to said floating position and said flow control valve is switched to said throttling position, said first throttle of said control valve device and said second throttle of said flow control valve are connected in series.

5. The conveyance vehicle according to claim 1, wherein said control valve device includes a first directional control valve switchable to any one of said neutral position, said raising position, and said floating position and a second directional control valve switchable to any one of said neutral position, said raising position, and said lowering position.

* * * * *